(12) United States Patent
Mathi et al.

(10) Patent No.: US 11,254,503 B2
(45) Date of Patent: Feb. 22, 2022

(54) RACKING FOR STORING ARTICLES IN STORAGE LOCATIONS OF RACKS

(71) Applicant: KNAPP AG, Hart bei Graz (AT)

(72) Inventors: Franz Mathi, Glesidorf (AT); Robert Lerche, Pirching am Traubenberg (AT); Wolfgang Puntigam, Studenzen (AT); Johannes Alois Hutter, Hart/Graz (AT); Alfred Gindl, Graz (AT); Alexander Resch, Wagna (AT)

(73) Assignee: KNAPP AG, Hart bei Graz (AT)

( * ) Notice: Subject to any disclaimer, the term of this patent is extended or adjusted under 35 U.S.C. 154(b) by 51 days.

(21) Appl. No.: 16/646,337

(22) PCT Filed: Mar. 5, 2019

(86) PCT No.: PCT/AT2019/060071
§ 371 (c)(1),
(2) Date: Mar. 11, 2020

(87) PCT Pub. No.: WO2019/173854
PCT Pub. Date: Sep. 19, 2019

(65) Prior Publication Data
US 2021/0362951 A1   Nov. 25, 2021

(30) Foreign Application Priority Data
Mar. 12, 2018   (AT) .............................. A 50212/2018

(51) Int. Cl.
*B65G 1/137* (2006.01)
*B65G 1/04* (2006.01)

(52) U.S. Cl.
CPC ......... *B65G 1/1375* (2013.01); *B65G 1/0421* (2013.01)

(58) Field of Classification Search
CPC ............................ B65G 1/1375; B65G 1/0421
See application file for complete search history.

(56) References Cited

U.S. PATENT DOCUMENTS

| 7,101,139 B1* | 9/2006 | Benedict | B63B 25/22 180/168 |
| 10,940,998 B2* | 3/2021 | Valinsky | B65G 1/1373 |
| 2014/0288696 A1* | 9/2014 | Lert | B65G 1/0492 700/216 |

(Continued)

FOREIGN PATENT DOCUMENTS

| AT | 518556 | 11/2017 |
| WO | 2014204300 | 12/2014 |

*Primary Examiner* — Kyle O Logan
(74) *Attorney, Agent, or Firm* — Workman Nydegger

(57) ABSTRACT

A racking for storing articles having guiding tracks and a rail vehicle, which may be moved on the guiding tracks for storing and retrieving the articles, wherein the guiding tracks merge in an intersection area. Within the guiding tracks there are formed current bars and at the rail vehicle there are formed current receivers engaging with the current bars and supplying the rail vehicle in the guiding tracks with energy. The intersection area is free of current bars. The rail vehicle has an intersection sensor, which is configured to detect whether the rail vehicle is within the intersection area. The vehicle control is configured to switch the rail vehicle, on the basis of the signals of the intersection sensor and the voltage in the guiding tracks, into different operation modes.

14 Claims, 1 Drawing Sheet

(56) References Cited

U.S. PATENT DOCUMENTS

Figure 1:
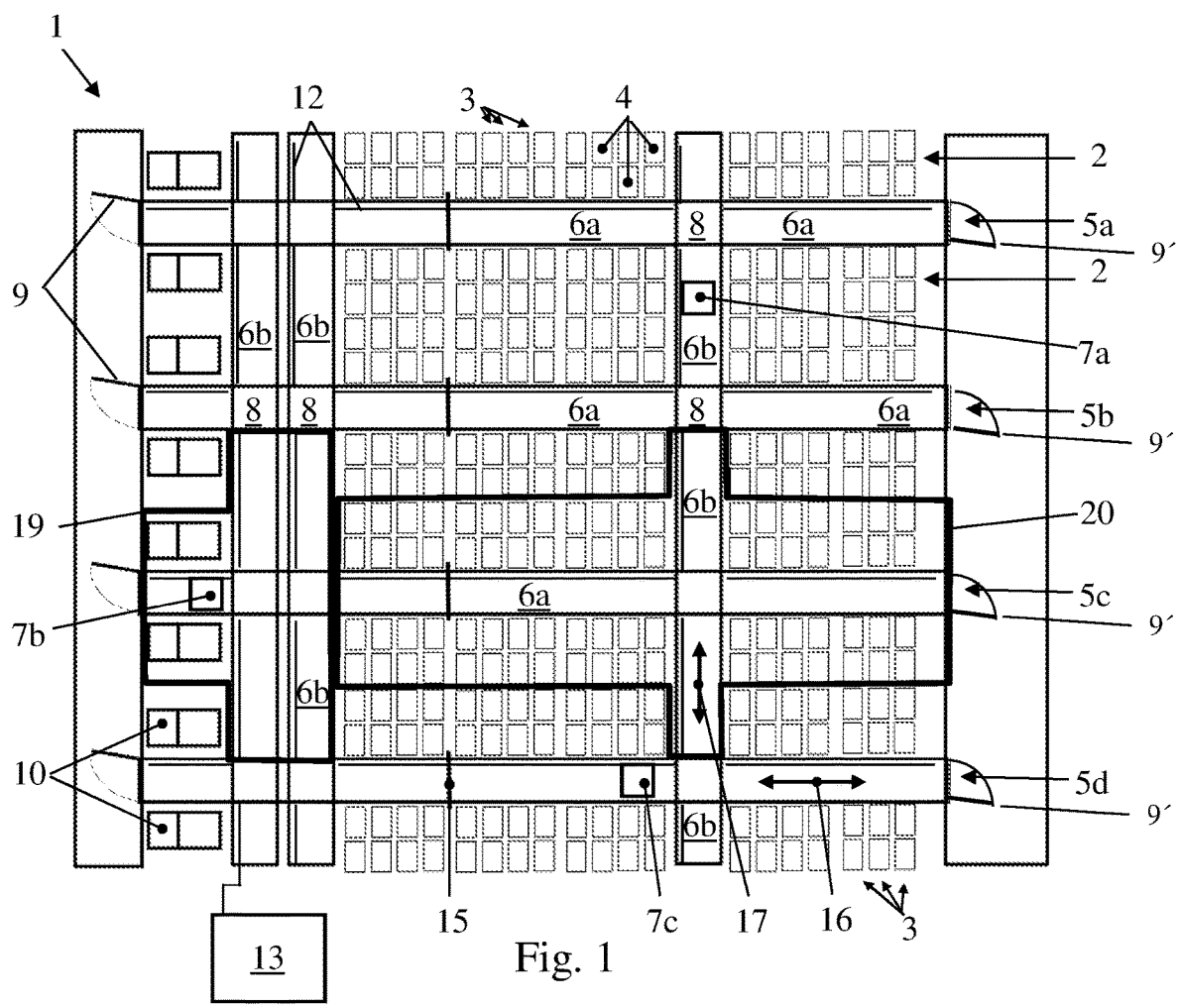

| | | | | |
|---|---|---|---|---|
| 2016/0075512 A1* | 3/2016 | Lert, Jr. | ............... | B65G 1/0492 |
| | | | | 414/273 |
| 2016/0355337 A1* | 12/2016 | Lert | ..................... | B65G 1/1378 |
| 2019/0062058 A1* | 2/2019 | Goetz | .................. | B65G 1/0478 |
| 2021/0237971 A1* | 8/2021 | Zhang | .................. | B65G 1/0492 |
| 2021/0323769 A1* | 10/2021 | Lert, Jr | ................ | B65G 1/1371 |

* cited by examiner

RACKING FOR STORING ARTICLES IN STORAGE LOCATIONS OF RACKS

The invention relates to a racking for storing articles in storage locations of racks according to the features of the preamble of claim 1.

The patent AT 516404 B1 discloses a racking having racks with storage locations for storing articles, wherein rack corridors extend between the racks. At the racking there are formed guiding tracks, wherein there are provided first guiding tracks in the direction towards the racks and second guiding tracks transversally to the racks, wherein the guiding tracks merge in at least one intersection area or cross therein. The guiding tracks are intended as conveyor paths for rail vehicles having a drive unit and a vehicle control and store or retrieve articles according to at least one order, controlled by the vehicle control and driven by the drive unit, into or from the storage locations. The intersection areas are intended as transferring areas for the rail vehicles between different guiding tracks. Due to the arrangement of the guiding tracks, the rail vehicles may move within the racking arbitrarily and reach every storage location connected to a guiding track.

With such rackings, the rail vehicles are in general supplied with energy by current storage units formed in the rail vehicles, wherein the rail vehicles may charge the current storage units at charging points. Charging points are, for example, formed at article transfer stations, as the rail vehicles will remain there recurrently for longer periods of time. The rail vehicles receive their orders for storing and retrieving articles via communication interfaces, such as WLAN, by a system control.

Due to maintenance, repair and servicing works in the racking it is necessary to enable access to the racking for persons. In order to not having to completely stop the operation of the racking, there will only be switched off areas of the racking in terms of technical security that are accessed by persons. For this purpose, a person applies for access to an area of the racking with the system control, wherein the system control then switches off this area and transmits a command via the communication interfaces to the rail vehicles in this area to exit the area in question, or it transmits the command for safety-related switch-off. Other rail vehicles currently situated outside of this area receive the command to not enter this area and to postpone or reroute orders, which require access to this area.

In the operation of such a racking, however, it has proven to be a disadvantage that the transmittance of commands to the rail vehicles may fail or may be realized only at a later point of time due to the amount of metal installed within the racking and the vast extent of the racking. In this way, it may occur, in particular with a safety-relevant switch-off, that the rail vehicles still continue to move also within the area, which is actually switched off, thus presenting a high safety risk for the person.

From the patents AT 516231 B1, AT 518556 B1 and AT 513977 B1, there has respectively been known a racking having racks, which has rack corridors extending between the racks, in which there are formed tracks that may be driven over by respectively one rail vehicle. The rail vehicles receive commands via current bars formed within the tracks and may be supplied with energy, wherein there may be realized a safe transmittance of commands via the current bars.

With the rackings known from the AT 516231 B1, AT 518556 B1 and AT 513977 B1 it has been proven to be disadvantageous that there have to be mandatorily formed current bars in the tracks driven over by the rail vehicles for safely transmitting commands, which would be problematic in regard to the intersection areas of tracks not disclosed in the patents AT 516231 B1, AT 518556 B1 and AT 513977 B1.

It is the task of the present invention to provide a racking, which overcomes the above mentioned disadvantages of prior art and may be safely switched off at any point of time.

According to the invention, the present invention is solved by a racking having the features of the characterizing part of the claim 1. Preferred embodiments of the invention are object of the dependent claims.

The racking according to the invention has at least one rack corridor between at least two racks. Advantageously, the racking has a plurality of racks and rack corridors extending between the racks. A rack is advantageously composed of several levels having a plurality of storage locations for article per level. The levels are advantageously arranged in a horizontal way in the operation of the racking.

At least one guiding track extends in each rack corridor, which is connected via at least one intersection area to at least one other guiding track, which in turn extends also at least in part within a rack corridor and/or outside of a rack corridor. There is further the possibility that at least one guiding track extends at least in some sections spaced apart from the racks. The guiding tracks are intended as conveyor path for at least one rail vehicle.

The guiding tracks are advantageously formed by two carriers configured as running rails, which are arranged spaced apart from another and serve as rolling surfaces for the wheels of the rail vehicles. The running rails may be essentially flat, they may, however, also be formed by pinions, wherein the wheels correspondingly may be formed by teethed wheels. Advantageously, the running rails are configured such that these may also assume the function of a lateral guiding along the guiding track.

The at least one intersection area acts for the at least one rail vehicle for changing from one guiding track to another guiding track, wherein within an intersection area, depending on the configuration of the racking, at least two guiding tracks will merge. The racking advantageously has a plurality of rail vehicles.

Depending on the configuration of the racking and the intersection area, there is the possibility that the rail vehicles change in the intersection area on a level horizontally arranged in particular in operation of the racking from one guiding track to another guiding track. Consequently, such an intersection area is also designated as horizontal intersection area. It is further possible that the rail vehicles change in the intersection area on a level horizontally arranged in particular in operation of the racking from one guiding track to a guiding track, which is arranged inclined on this level, or that they change from that inclined guiding track to a guiding track on a level. Consequently, such an intersection area is also designated as vertical intersection area. The guiding tracks may be arranged inclined towards one another at an angle of 30°, 45° or 90°, this is, obliquely or vertically upwards or downwards. It is further possible that the inclined guiding track is not flat but rather curved in order to smooth the transition between the guiding tracks.

Within an intersection area, usefully not more than six guiding tracks will merge.

The guiding tracks merge in the horizontal intersection area preferably at an angle of 90°. The at least one rail vehicle is thus usefully configured in an essentially triangular form, wherein there are arranged, at first lateral areas opposite to one another of the rail vehicles, wheels that are configured to drive in a first direction, and wherein, at second lateral areas opposite to one another of the rail vehicles, wheels vertically extendable and retractable in the operation of the racking, which are configured to drive in a second direction offset by 90° to the first direction. In an alternative embodiment variant it is also possible that the rail vehicles have only four wheels, which are preferably configured pivotable at the corners of the rail vehicle. This has the advantage that a rail vehicle may change independently and without any further accessories such as rotating discs etc. in the at least one horizontal intersection area from one guiding track to another guiding track extending preferably transversely thereto, for example, by rotation about its own axis.

With the aid of vertical intersection areas, the rail vehicles may be transferred in-between the levels in a racking having several levels. For this purpose, there is advantageously provided an active switch point between the guiding tracks. In particular in the case of steep guiding tracks, it is advantageous to realize separate running rails for the rear and front wheels in order to keep the articles transported by the rail vehicle or the rail vehicle itself, respectively, permanently in a horizontal position. In order to prevent slipping of the wheels of the rail vehicles in particular in the case of steeply inclined guiding tracks, the guiding tracks are advantageously configured with pinions, and the rail vehicles have respective teethed wheels engaging with the pinion.

The at least one rail vehicle has at least one vehicle control and at least one drive unit. The at least one vehicle control controls storing and retrieving the articles into and from the racking according to at least one order. The at least one drive unit serves for driving the rail vehicles. The vehicle control preferably includes all control units required for the control of the rail vehicle, with the vehicle control having in particular a partly integrated safety control.

The guiding tracks each have at least one current bar. The at least one current bar advantageously has at least two contacts, with a first contact forming a first pole, for example, the + pole, and a second contact forming the second pole, for example, the − pole. It is, however, also possible that alternate current is applied to the contacts. It is further possible that there is formed only one contact in the case of the carriers of the guiding tracks being made from metal, wherein the one contact formed in the current bar forms the first pole and the carrier forms the second pole. The carriers are usefully made from an electrically conductive material, preferably aluminium or iron.

The at least one rail vehicle has at least one current receiver, which engages with the at least one current bar and supplies the rail vehicle in the guiding tracks with energy. The current receiver thus advantageously has the same number of contacts as the at least one current bar. Transmitting orders to the vehicle control may be modulated to the current supply, via at least one additional contact in the current bars, or it may be realized via an additional wireless connection, such as, for example, WLAN.

At least a part of the at least one intersection area is free of current bars. Preferably the entire intersection area is free of current bars. In this way, the rail vehicles may simply pass the intersection area, without any failure contacts occurring between elements of the rail vehicles and the current bars. The current bars are advantageously attached laterally to the guiding tracks.

The racking has a system control, which provides the voltage in the at least one current bar. Depending on the requirement, each current bar may be controlled individually by the system control, or a plurality of current bars is joined to a cluster, being collectively controlled by the system control. In the case of a plurality of guiding tracks it is further possible that individual current bars are individually controlled and other current bars are controlled jointly in clusters. In this way, depending on the embodiment variant, the current bars are individually connected to the system control and/or are connected with one another into a cluster, being connected to the system control as a cluster.

The at least one rail vehicle has at least one intersection sensor and a current storage unit. The at least one intersection sensor is configured to detect whether the rail vehicle is within an intersection area. The at least one intersection sensor is advantageously formed by an optical sensor, an inductive sensor or a capacitive sensor, wherein there are formed in the intersection area, corresponding to the sensor used, means, using which the sensor may interact and using which the sensor may distinctly identify whether the rail vehicle is currently within an intersection area or not. Such a means may be formed, for example, by a curved metal sheet attached within the intersection area or by a reflector attached within the intersection area. The current storage unit is configured to temporarily supply the rail vehicle with energy. The current storage unit may, for example, be formed by a power cap, a battery or a combination of both.

The vehicle control is connected to the at least one current receiver, the at least one intersection sensor, the at least one drive unit and the at least one current storage unit, and is configured to switch the rail vehicle at a first voltage detected at the current receiver into a normal operation mode, in which the rail vehicle operates according to the order at a second voltage detected at the current receiver into a safety mode, in which the vehicle control switches off the at least one drive unit, preferably all drive units of the at least one rail vehicle that may present a danger;

at a third voltage detected at the current receiver and upon detection of the intersection sensor that the rail vehicle is within the intersection area into a transfer mode, in which the rail vehicle operates according to the order, wherein the at least one current storage unit, in the transfer mode, supplies the at least one rail vehicle with current; and at the third voltage detected at the current receiver and upon detection of the intersection sensor that the at least one rail vehicle is outside of the at least one intersection area into a safety mode, in which the vehicle control switches off the at least one drive unit of the rail vehicle.

In this way there is obtained the advantage that the racking according to the invention may be operated very safely and securely. If access to an area of the racking is applied for, then the system control will switch the voltage of the current bar/the current bars in this area from the first voltage to the second voltage. A rail vehicle situated in this area on a guiding track will in this way be switched immediately from the normal operation mode into the safety mode, in which the vehicle control switches off the drive unit of the rail vehicle, whereby this is stopped. If a rail vehicle is currently in an intersection area, this will carry out the operation assigned thereto according to an order until it is again in contact with a current bar. If the rail vehicle wants to enter an area for which access has been applied for and if the vehicle control of the rail vehicle detects the second voltage at the current bar when entering the area, then the rail vehicle will switch into the safety mode. As a consequence, the racking according to the invention or portions thereof may be reliably switched off for access to the racking or for any other important maintenance, repair and servicing works at any point of time, even though no current bars are formed within the intersection areas.

If the vehicle control of a rail vehicle detects the third voltage at the at least one current receiver, then the vehicle control will also examine via the intersection sensor if the rail vehicle is currently within an intersection area. If the rail vehicle is within the intersection area, then the vehicle control will switch the at least one rail vehicle into the transfer mode and continues to carry out the operation assigned according to the order, wherein the rail vehicle in the transfer mode changes from one guiding track to another guiding track.

However, if the vehicle control detects that the rail vehicle is outside of an intersection area, then the rail vehicle will be switched into the safety mode, in which the vehicle control switches off the at least one drive unit of the rail vehicle that may present a danger, thus stopping the vehicle. This has the advantage that in particular in the case of a power failure or emergency stop there will be ensured that the rail vehicle may be securely stopped and does not continue to carry out orders of storage or retrieval in the normal operation mode until the current storage unit is empty.

The first and the second voltage of 0V are preferably different and/or respectively different voltage ranges.

The first voltage is advantageously to be set at 48V+/− 20%. It is also possible that the first voltage is a voltage range between 30V and 70V, meaning that each voltage within this range will correspond in the vehicle control to the first voltage, whereby the rail vehicle accordingly switches into the normal operation mode.

The second voltage is advantageously to be set at 24V+/− 20%. It is also possible that the second voltage is a voltage range between 18V and 30V, meaning that each voltage within this range will correspond in the vehicle control to the second voltage, whereby the rail vehicle accordingly switches into the safety operation mode.

The second voltage is sufficient to supply the at least one rail vehicle with energy also in the safety operation. In this way, also with longer security-relevant switch-off of the at least one rail vehicle, for example, in the case of longer access, the at least one rail vehicle may immediately re-assume its operation and need not be started up upon provision of a voltage required for the operation of the vehicle control in order to re-assume operation. If the rail vehicle is connected to the system control via a wireless connection for receiving orders, then this connection may be continued to be maintained during the safety mode.

It is also possible that upon detection of a second voltage all drives of the rail vehicle are switched off or that a drive of a picking unit of the rail vehicle, which is configured for storing and retrieving articles, will be switched off only if the storage or retrieval of a currently to be stored or retrieved article has been completed. In order to prevent an unexpected operation of the drive of the picking unit in the case of a failure, the vehicle control advantageously has a control element, which switches off the drive of the picking unit upon detection of the second voltage also if storage or retrieval of articles has not been completed yet.

The third voltage is to be set preferably at 0V or by a voltage range comprising 0V. The voltage range is advantageously 0V to 18V, meaning that each voltage in this range in the vehicle control corresponds to the third voltage.

The vehicle control is preferably configured in the normal operation mode and/or in the safety mode to charge the current storage unit. In this way, there is obtained the advantage that at least one rail vehicle will be completely functional upon switching into the normal operation mode.

The vehicle control is usefully configured to switch off the drive unit of the rail vehicle in the safety mode such that the vehicle control completely stops the rail vehicle within a guiding track. As the at least one rail vehicle in at least one intersection area cannot receive safety-related commands due to the absence of the current bars, this will operate in the transfer mode and carry out its operation assigned according to an order until it detects at the current receivers a second voltage or detects at the current receivers a third voltage and is outside of the intersection areas. As the current receiver in a preferred embodiment has a smaller length in relation to the length or width, respectively, of the at least one rail vehicle, it may be the case that the rail vehicle stops at least in part in the intersection area, in this way, blocking it. Consequently, it is advantageous if the at least one rail vehicle is switched off in a delayed way such that it can still exit the intersection area. In this way, this remains free, not being blocked by a rail vehicle or by parts of the rail vehicle.

The vehicle control advantageously has a counter that starts counting once the vehicle control switches into the transfer mode, wherein the vehicle control is configured to switch the at least one rail vehicle into the safety mode if the rail vehicle does not exit the transfer mode within a counter limit. In this way, there is obtained the advantage that the at least one rail vehicle, also in the case of a defect, which will only occur temporarily exactly in an intersection area, will not be put into operation on its own when accessed. Consequently, the safety and security within the racking for a person will be additionally increased during access.

Depending on requirement and constructional situation, the guiding tracks may be straight or in some sections bent, forming a curve and/or inclination. The guiding tracks are advantageously configured such that space that is available will be optimally used.

The racking usefully has at least one passage detector and/or an access sensor, which is/are coupled to the system control, wherein the system control is configured to provide, depending on a signal generated by the passage detector or access sensor, respectively, the voltage applied at one or a plurality of current bars. The passage detector is advantageously formed by a light barrier or by a turnstile having one or several arms. The access sensor is advantageously formed by a simple button.

It is further advantageous if, in combination with the access sensor, there is also provided at least one indicator lamp, whereby the system control may indicate to the person information regarding the current operation mode of the area situated behind the passage detector. By way of the passage detector, there is obtained the advantage that, in the case of a person moving from an area that is safety-related switched off to an area that has not been switched off, also the area that has not been switched off will be switched off upon triggering the passage detector. In this way, the area in question that is to be switched off may be kept small and any other areas that have not been switched-off may be kept productive, without limiting the safety of a person accessing the racking.

In a further embodiment variant of the system according to the invention, the vehicle control is configured to detect a bit sequence on the basis of characteristics measured at the current bar and
    to switch the rail vehicle in the case of a first bit sequence detected at the at least one current receiver into a normal operation mode, in which the at least one rail vehicle operates according to orders;

to switch the rail vehicle in the case of a second bit sequence detected at the at least one current receive into a safety mode, in which the vehicle control switches off the at least one drive unit, preferably all drive units of the at least one rail vehicle that may present a danger;

to switch the rail vehicle in the case of a third bit sequence detected at the at least one current receiver or upon detection of the at least one intersection sensor that the at least one rail vehicle is within the at least one intersection area into a transfer mode, in which the at least one rail vehicle operates according to orders, while the at least one current storage unit supplies the at least one rail vehicle during transfer mode with current; and to switch the rail vehicle in the case of a third bit sequence detected at the at least one current receiver or upon detection of no first or second bit sequence or upon detection of the at least one intersection sensor that the at least one rail vehicle is within the at least one intersection area into a safety mode, in which the vehicle control switches off the at least one drive unit of the rail vehicle that may present a danger.

Further advantageous embodiment variants of the racking according to the invention are explained in greater detail in the following by way of the figures.

Figure 2:
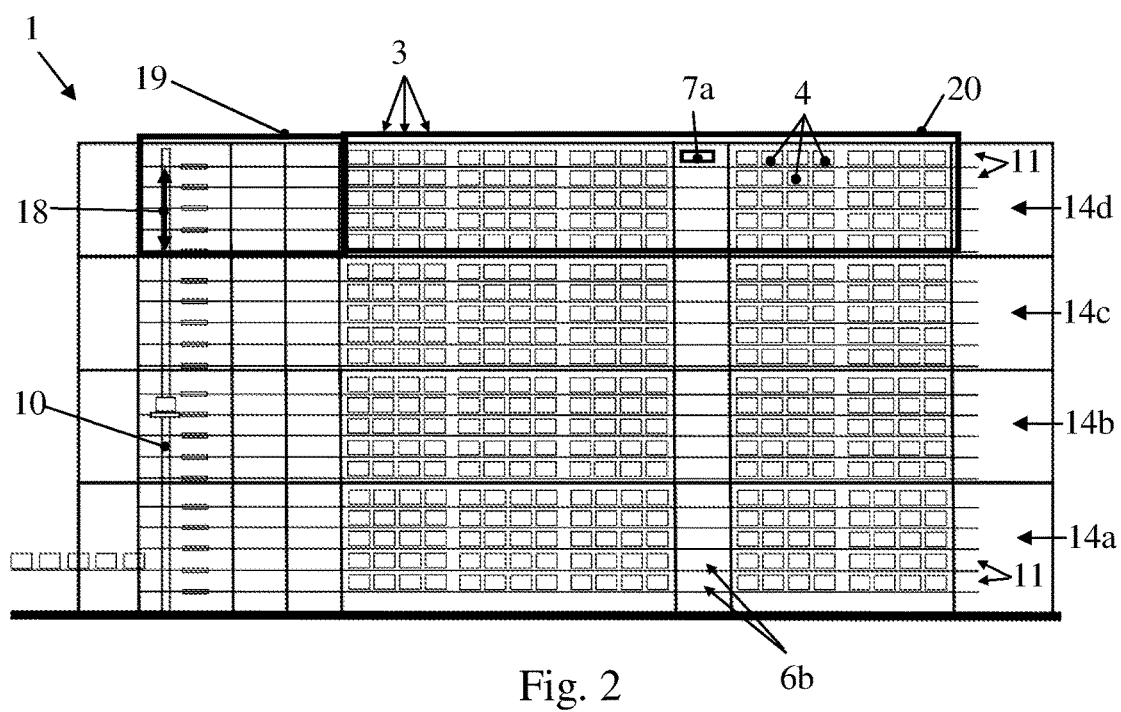

The FIGS. 1 and 2 show an embodiment variant of a racking according to the invention in a schematic top view and a schematic side view.

The FIGS. 1 and 2 show an embodiment variant of a racking 1 according to the invention in a schematic top view. The racking 1 includes a plurality of racks 2 having a multitude of storage locations 3 on different levels 11 for storing boxes 4 or containers filled with articles, wherein two boxes 4 or containers, respectively, may be stored one behind the other in each storage location 3. Rack corridors 5a to 5d extend between respectively two racks 2. Each rack corridor 5a to 5d extends across four storeys 14a to 14d, wherein each storey 14a to 14d has five levels 11. Each storey 14a to 14d has one door 9 and one door 9' as well as a passage detector formed by a light barrier 15 per rack corridor 5a to 5d.

Lifts 10 are formed between the rack corridors 5, which may transport boxes 4 or containers between the levels 11 of the racking 1 upwards and downwards in a vertical direction 18.

The racking 1 on each level 11 further has guiding tracks 6a and 6b and three rail vehicles 7a, 7b and 7c, wherein the guiding tracks 6a extend along the rack corridors 5a to 5d and the guiding tracks 6b transversely to the rack corridors 5a to 5d. Advantageously, the racking 1 has more than three rail vehicles 7a, 7b and 7c per level 11, the racking 1, however, may also have only one or two rail vehicles 7a, 7b or 7c per level 11. The racking 1 has several intersection areas 8, in which respectively two guiding tracks 6a and 6b merge. The guiding tracks 6a and 6b merge at an angle of 90° on a level 11 in the intersection area 8. The guiding tracks 6a and 6b are configured horizontal in this embodiment variant of the racking 1 in the operation of the racking 1.

The rail vehicles 7a, 7b and 7c each have a vehicle control not depicted and a drive unit not depicted, wherein the rail vehicles 7a, 7b and 7c each may be moved, controlled by the vehicle control and driven by the drive unit, along the guiding tracks 6a and 6b. The rail vehicles 7a, 7b and 7c further each have at lateral areas opposite to one another first wheels that are not depicted, which are configured to drive in a first direction 16 along the guiding tracks 6a and wherein there are arranged at second lateral areas opposite to one another of the rail vehicles 7a, 7b and 7c second wheels not depicted and extendable and retractable in the vertical direction, which are configured to drive in a second direction 17 offset to the first direction by 90° along the guiding tracks 6b. The rail vehicles 7a, 7b and 7c may change across the intersection areas 8 either between guiding tracks 6a, or guiding tracks 6b, or from one guiding track 6a to a guiding track 6b or from a guiding track 6b to a guiding track 6a.

Within the guiding tracks 6a and 6b there are continuously formed current bars 12, and the rail vehicles 7a, 7b and 7c each have two current receivers not depicted, which are configured to engage with the current bars 12 if the rail vehicles 7a, 7b and 7c move along the guiding tracks 6a and 6b in order to supply the rail vehicles 7a, 7b and 7c with energy. The intersection areas 8 are free of current bars 12. The current bars 12 are connected to a system control 13 of the racking 1, jointly in clusters. The connection between the current bars 12 and the system control 13 is only schematically depicted in FIG. 1.

The current bar 12 of a guiding track 6a is advantageously joined with all current bars 12, situated directly above and/or underneath, of the guiding tracks 6a within a storey 14a, 14b, 14c or 14d respectively in to a cluster and connected to the system control 13 as a cluster. The system control 13 is configured to provide a voltage in the current bars 12 of a cluster.

There is to be noted, however, that the current bars 12 may also be connected individually to the system control 13, or they may be connected to the system control 13, joined in any cluster.

The rail vehicles 7a, 7b and 7c are configured to store or retrieve boxes 4 or containers with articles according to at least one order into or from the storage locations 3. The commands required for this purpose are transmitted to the vehicle control of the rail vehicles 7a, 7b or 7c either via a remote connection, for example, WLAN, or via the current bars 12 by modulating a data signal. In order to store or retrieve boxes 4 or containers, respectively, into or from the storage locations 3 and to transfer boxes 4 or containers, respectively, to the lifts 10, the rail vehicles 7a, 7b and 7c each have a picking unit. This will not be described in greater detail herein, as it is well known to those skilled in the art.

The rail vehicles 7a, 7b and 7c furthermore have an intersection sensor not depicted and a current storage unit. The intersection sensor is formed by an inductive sensor and configured to detect whether a rail vehicle 7a, 7b or 7c is within an intersection area 8. For this reason, there are mounted metal sheets not depicted in the intersection areas 8, wherein the intersection sensor will go off as soon as it detects such a metal sheet. The current storage unit is configured to supply the rail vehicle 7a, 7b or 7c temporarily with energy. The intersection sensor, however, may also be formed by a capacitive or an optical sensor.

With each rail vehicle 7a, 7b or 7c, the vehicle control is connected to the current receivers, to the intersection sensor, to the drive unit and to the current storage unit.

In a normal operation of the racking 1, there is applied a first voltage, for example, 48 volt, at all current bars 12, controlled by the system control 13. This is detected by the vehicle control of the rail vehicles 7a, 7b and 7c when driving in the guiding tracks 6a and 6b via the current receiver, and the rail vehicles 7a, 7b and 7c operate in the normal operation mode. In the normal operation mode, the rail vehicles 7a, 7b and 7c each carry out orders transmitted by the system control 13, wherein they retrieve energy from the current bars 12. An order may be, for example, to pick up a box 4 or a container from a determined storage location 3 and to transfer it to a lift 10 or to pick up a box 4 or a container from a lift 10 and store it into a determined storage location 3.

If a rail vehicle 7a, 7b or 7c enters an intersection area 8 in order to carry out an order, then this will not detect in the intersection area 8, due to an error of the current bar 12, the first voltage but rather a third voltage of 0V at the current receivers, and it will detect by means of the intersection sensor that it is within an intersection area 8. In this case, the vehicle control of the rail vehicle 7a, 7b or 7c switches into a transfer mode. In the transfer mode, the rail vehicle 7a, 7b or 7c continues to operate according to orders, wherein the rail vehicle 7a, 7b or 7c in the transfer mode is supplied with energy via the current storage unit and changes between two guiding tracks 6a, between two guiding tracks 6b, from a guiding track 6 to a guiding track 6b or from a guiding track 6b to a guiding track 6a.

When transferring or changing, respectively, between a guiding track 6a and a guiding track 6b, the rail vehicle 7a, 7b or 7c, for example, driven by the first wheels, drives into the intersection area 8. By driving out the second wheels in a vertical direction 18, the rail vehicle 7a, 7b or 7c may drive out of the intersection area 8 into the guiding track 6b on the second wheels.

When transferring between a guiding track 6a and a further guiding track 6a or a guiding track 6b and a further guiding track 6b, the rail vehicle 7a, 7b or 7c will pass the intersection area 8 in a straight line.

If the rail vehicle 7a, 7b or 7c again drives out of the intersection area 8 and drives into a guiding track 6a or 6b, then this will again detect the first voltage at the current receivers, and the rail vehicle 7a, 7b or 7c will again be supplied with energy via the current bar 12, and the current storage unit will be recharged.

In the following there is described a safety-related switch-off of a part of the racking 1 in greater detail, wherein the safety-related switch-off is explained in greater detail as an example by way of the rack corridor 5c, storey 14d. There can, however, also be switched off in a similar way all storeys 14a to 14d of the further rack corridors 5a, 5b or 5c, or also several storeys 14a to 14d of the rack corridors 5a to 5d can be switched off simultaneously. If a person wants to access the rack corridor 5c on the storey 14d for carrying out maintenance works, he/she will press an access push-button, which is arranged in the area of the door 9' for the storey 14d of the rack corridor 5c. There is to be noted, however, that for reasons of simplicity there is not indicated any access to the individual storeys 14a to 14d in the FIGS. 1 and 2. A person may have easy access to the storeys 14a to 14d in an advantageous way via one or several staircases.

The access push-button is connected to the system control 13, wherein, by pressing the access push-button, the system control 13 sends a signal to the rail vehicles to exit the area in question, in this case an area 20, or to not enter it, respectively. An indicator lamp attached at the access push-button may indicate the status of the area 20 to be accessed to the person. By opening the door 9', the system control applies a second voltage corresponding to 24V to the current bars 12 of the guiding tracks 6a of the levels 11 of the storeys 14d of the rack corridor 5c in the area 20. Furthermore, there is also applied the second voltage of 24V in the area 20 to all current bars 12 of the guiding tracks 6b neighbouring these guiding tracks 6a via an intersection area 8 by the system control. See in particular FIG. 1. If a rail vehicle 7a, 7b or 7c is currently within this part of the racking 1, then the vehicle control of the rail vehicle 7a, 7b or 7c will detect via the current receiver the voltage changed to the second voltage and will switch the rail vehicle 7a, 7b or 7c into a safety mode, in which the vehicle control switches off the drive unit of the rail vehicle 7a, 7b or 7c. Advantageously, there are also switched off the drives, for example, telescopic drives, piston drives, etc. of the picking unit. This is, for example, realized by means of a relay or by means of a semi-conductor element, which is controlled by the vehicle control, whereby the drive unit(s) is/are switched to no voltage. In this way, advantageously all movements of the rail vehicle 7a, 7b or 7c are stopped. Large and heavy rail vehicles 7a, 7b or 7c advantageously have in addition breaked wheels in order to stop the rail vehicles more rapidly. It is, however, also possible that the drives of the picking unit are switched off in a delayed way in order to complete any storage or retrieval operation currently being carried out.

If a rail vehicle 7a, 7b or 7c is currently in the transfer mode in an intersection area 8, which is why it does not have any contact with the current bar 12, then this will operate until it again is in contact with a current bar 12. If this current bar 12 conducts the second voltage, this will be detected by the vehicle control, and the rail vehicle 7a, 7b or 7c will be switched into the safety mode, stopping due to switching off the drive unit. Advantageously, the rail vehicle 7a, 7b or 7c will stop in a way such that it has exited the intersection area 9 in order to prevent blocking it. Thus, the intersection area will be available for another rail vehicle 7a, 7b or 7c, which changes, for example, from a guiding rail 6a or 6b having a first voltage applied to a current bar 12 to another guiding track 6a or 6b having a first voltage applied to the current bar 12 in order to carry out an order.

If a person, upon access, passes the passage sensor 15 in the rack corridor 5c on the storey 14d, also the area 19 of the rack corridor 5c on the storey 14d will be switched off by the system control 13 for safety reasons, wherein, in addition to the guiding track 6a in the rack corridor 5c in the area 19, also any other guiding tracks 6b neighbouring the guiding track 6a via the intersection areas 8 will be switched off for safety-related reasons. See in particular FIG. 1. Accordingly, also the rail vehicle 7b would switch into the safety mode.

In the case that there is a power failure in the racking 1, the current bars 12 will be immediately without voltage, with the third voltage of 0V being applied to the current bars 12. In order to not present a safety risk in the case of access and in order to prevent a sudden movement of a rail vehicle 7a, 7b or 7c, the vehicle control will switch off the drive unit of the rail vehicle 7a, 7b or 7c upon detection of the third voltage and upon detection of the intersection area sensor that the rail vehicle 7a, 7b or 7c is situated outside of the intersection area 8, this is in a guiding track 6a or 6b, and it will switch into a safety mode. In the safety mode the rail vehicle 7a, 7b or 7c has stopped. If a rail vehicle 7a, 7b or 7c is currently in the transfer mode in an intersection area 8 during the power failure, this will continue to drive, as it is being supplied by the current storage unit, until the intersection sensor detects that the rail vehicle 7a, 7b or 7c is outside of the intersection area 8.

There is further to be noted that the areas 19 and 20 may also be extended across more or fewer guiding tracks 6a or 6b, respectively, and that the passage detectors 15 may also be configured at other positions within the racking 1.

The invention claimed is:

1. A racking for storing articles in storing locations of racks having at least one rack corridor, which is formed between at least two racks, having at least two guiding tracks and at least one rail vehicle having a vehicle control and at least one drive unit, which may be controlled by the vehicle control and driven by the drive unit on the guiding tracks for storing and retrieving the articles according to at least one order, wherein the guiding tracks merge at least in one intersection area and wherein the rail vehicle changes between the guiding tracks across the intersection area, wherein within the guiding tracks there is formed respectively continuously at least one current bar and at the rail vehicle there is formed at least one current receiver engaging with the current bar and supplying the rail vehicle in the guiding tracks with energy, wherein the rack includes a system control providing a voltage within the current bar, such that at least a part of the at least one intersection area is free of current bars, that the rail vehicle has at least one intersection sensor and a current storage unit, wherein the intersection sensor is configured to detect whether the rail vehicle is within the intersection area and wherein the current storage unit is configured to temporarily supply the rail vehicle with energy, and wherein the vehicle control is connected to the current receiver, to the intersection sensor, the drive unit and the current storage unit and configured to switch the rail vehicle
- at a first voltage detected at the current receiver into a normal operation mode, in which the rail vehicle operates according to the order,
- at a second voltage detected at the current receiver into a safety mode, in which the vehicle control switches off the drive unit of the rail vehicle,
- at a third voltage detected at the current receiver and upon detection of the intersection sensor that the rail vehicle is within the intersection area into a transfer mode, in which the rail vehicle operates according to the order, wherein the current storage unit, in the transfer mode, supplies the rail vehicle with current and
- at the third voltage detected at the current receiver and upon detection of the intersection sensor that the rail vehicle is outside of the intersection area into a safety mode, in which the vehicle control switches off the drive unit of the rail vehicle.

2. A racking according to claim 1, wherein the first and the second voltage of 0V are different and respectively different voltage ranges.

3. A racking according to claim 1, wherein the third voltage is 0V or formed by a voltage range including 0V.

4. A racking according to claim 1, wherein the vehicle control is configured to charge the current storage unit at a first voltage and/or second voltage detected at the current receiver.

5. A racking according to claim 1, wherein the vehicle control is configured to switch off the drive unit of the rail vehicle in the safety mode such that the vehicle control completely stops the rail vehicle within a guiding track.

6. A racking according to claim 1, wherein the vehicle control has a counter starting to count as soon as the vehicle control switches into the transfer mode, wherein the vehicle control is configured to switch the rail vehicle into the safety mode if the rail vehicle does not exit the transfer mode within a counter limit.

7. A racking according to disclaim 1, wherein the racking has at least one passage sensor, which is coupled to the system control, wherein the system control is configured to provide, as a function of a signal generated by the passage detector, the voltage applied at the current bars.

8. A racking according to claim 1, wherein the guiding tracks are straight or bent in some sections, forming a curve or an inclined/declined distance.

9. A racking according to claim 1, wherein the guiding tracks are individually connected to the system control and/or are connected to the system control combined in clusters.

10. A racking according to claim 1, wherein the at least two guiding tracks in the intersection area merge in an in particular horizontal plane preferably at an angle of 90 degrees.

11. A racking according to claim 1, wherein the at least two guiding tracks are arranged inclined towards one another, in particular at an angle of 30°, 45° or 90°.

12. A racking according to claim 1, wherein the racking has a plurality of guiding tracks and a plurality of intersection areas, wherein within each intersection area at least two up to at the most six guiding tracks will merge.

13. A racking according to claim 1, wherein at least one guiding track extends within the rack corridor.

14. A racking according to claim 1, wherein at least one guiding track extends spaced apart from the racks.

* * * * *